United States Patent
Riney et al.

(10) Patent No.: US 11,214,727 B1
(45) Date of Patent: Jan. 4, 2022

(54) SEALANTS AND LUBRICANTS FOR WIRELINE OPERATIONS

(71) Applicant: Lubchem Inc., Spring, TX (US)

(72) Inventors: Howard Casey Riney, Montgomery, TX (US); Spencer Stratford Awbrey, Spring, TX (US)

(73) Assignee: Lubchem Inc., Spring, TX (US)

( * ) Notice: Subject to any disclaimer, the term of this patent is extended or adjusted under 35 U.S.C. 154(b) by 0 days.

(21) Appl. No.: 17/035,098

(22) Filed: Sep. 28, 2020

Related U.S. Application Data

(60) Provisional application No. 63/025,302, filed on May 15, 2020, provisional application No. 62/924,382, filed on Oct. 22, 2019, provisional application No. 62/906,977, filed on Sep. 27, 2019.

(51) Int. Cl.
*C09K 8/514* (2006.01)
*C09K 8/54* (2006.01)
*E21B 17/20* (2006.01)

(52) U.S. Cl.
CPC .............. *C09K 8/514* (2013.01); *C09K 8/54* (2013.01); *C09K 2208/32* (2013.01); *C09K 2208/34* (2013.01); *E21B 17/20* (2013.01)

(58) Field of Classification Search
CPC ...... C09K 8/514; C09K 8/54; C09K 2208/32; C09K 2208/34; E21B 17/20
See application file for complete search history.

(56) References Cited

U.S. PATENT DOCUMENTS

| | | | |
|---|---|---|---|
| 4,555,352 A | 11/1985 | Garner et al. | |
| 5,851,958 A | 12/1998 | Halliday et al. | |
| 6,159,906 A | 12/2000 | McNally | |
| 7,932,220 B2 | 4/2011 | Zazovsky et al. | |
| 8,691,732 B2 | 4/2014 | Del Gaudio et al. | |
| 9,012,379 B2 | 4/2015 | Muthusamy et al. | |
| 9,605,231 B2 | 3/2017 | Bredsgurd | |
| 9,796,901 B2 | 10/2017 | Muthusamy et al. | |
| 2005/0263290 A1 | 12/2005 | Zazovsky et al. | |
| 2008/0207472 A1* | 8/2008 | Valls | C10M 169/044 508/115 |
| 2012/0220503 A1* | 8/2012 | Sanchez Reyes | C09K 8/685 507/213 |
| 2014/0262267 A1* | 9/2014 | Fustos | E21B 33/13 166/292 |
| 2015/0184057 A1 | 7/2015 | Muthusamy et al. | |

* cited by examiner

*Primary Examiner* — Alicia Bland
(74) *Attorney, Agent, or Firm* — M. Susan Spiering; Ochoa & Associates, P.C.

(57) ABSTRACT

Disclosed herein is a composition of matter and method of use for wireline operations in the oil/gas industry. A glycerin water base composition having optional additives, was found to yield a tacky mixture stable to temperatures up to about 195° C. and as low as −50 C. When used as a wireline fluid, the inventive composition formed a seal from the oil or gas inside or outside the wellbore. The composition can be used in downhole (and serve as a lubricant) or above hole (and serve as a sealant) operations. When the composition contains corrosion inhibitors, it was found that wireline could be protected against corrosion from atmospheric conditions during storage for up to 30 days. Unlike other sealants/lubricants known in the industry, after use, the composition is easy to clean with water, wherein the water does not need further treatment prior to disposal.

17 Claims, 8 Drawing Sheets

SEALANTS AND LUBRICANTS FOR WIRELINE OPERATIONS

CROSS REFERENCE TO RELATED APPLICATIONS

This Non Provisional patent application is based on U.S. Provisional Patent Application Ser. No. 62/906,977, filed on Sep. 27, 2019, and U.S. Provisional Patent Application Ser. No. 62/924,382, filed on Oct. 22, 2019, and U.S. Provisional Patent Application 63/025,302 filed on May 15, 2020 the priority of which all are claimed, and the disclosure of all of which is incorporated by reference.

FIELD OF THE INVENTION

The present invention relates to sealants and lubricants and more particularly to sealants and lubricants for wireline operations, designed specifically for use in in oil and gas well logging operations where a lubricating dynamic seal is required.

BACKGROUND OF THE INVENTION

In the oil and gas industry, the term wireline usually refers to a cabling technology used by operators of oil and gas wells to lower equipment or measurement devices into the well for the purposes of well intervention, reservoir or well evaluation, and pipe recovery to name a few applications.

A wireline is an electrical cable used to lower tools into and transmit data about the conditions of the wellbore called wireline logs. Usually consisting of braided cables, wirelines are used to perform wireline logging, as well.

In oil and gas wire line operations the wireline is passed through a short chamber of little volume. This chamber sits on top of the valves above the well bore. To fill the volume of this chamber not used by the wireline a sealant/lubricant is pumped continuously to replace loss as the wireline goes down hole or out of the hole. The wireline lubricant/sealant main purpose is to seal the chamber, second to lubricate the wireline and to protect the wireline from corrosion.

Wireline fluids today generally are in two major groups of oil. The most common group is that made from hydrocarbon oils with polymers and or tackifiers added to seal and a corrosion inhibitor to protect the wireline. The second group is made from vegetable oils and modified vegetable oils; this group makes up a very small part of the market.

A search of sealants and lubricants for the wireline industry found few references on actual wireline fluids. This may be due to the small part these fluids play in the wireline industry. However, references were located directed to the well-bore or down-hole lubrication of the wireline. The down hole or well-bore lubricants are a high-volume product, whereas the wireline sealants/lubricants are a very small volume product in the oil and gas market or industry.

U.S. Pat. No. 9,605,231B2 and WO2012/173665A1, to Jakob Bredsgurd are directed to the use of estolides which are a type of modified vegetable oil or grease compositions as wireline fluids.

As mentioned above, many references were located directed to the well bore or down hole lubricants though not sealants/lubricants for the wireline above the wellbore. The following references reflect general information on these systems, and more particularly those directed to modified vegetable oil or fatty acids. These patents include: U.S. Pat. No. 8,071,510B2 (Sulfated Vegetable Oil); WO2017/176244A1 (Lubricant For Drilling And Drill-In Fluids); WO2016/019216A1 (Additive Composition For Well Treatment Fluids And Methods For Their Use); US Patent Application US2016/0362368A1 (Lauric Ester Compositions); U.S. Pat. No. 9,394,550B2 (Lauric Ester Compositions) and U.S. Pat. No. 8,778,850B2 (Biodegradable Stimulation Fluid).

Related to the above is the use of oleaginous microbial cells which are covered in WO2016/004401A1 and US patent Application US2016/0002521A1. These references disclose oils containing microbial cells.

Another area covering down hole sealants/lubricants is that of breaker fluids using esters of dicarboxylic acid. The following references disclose breaker fluids: U.S. Ser. No. 10/214,667 (Breaker Fluids And Methods Of Use Thereof); US Patent Application 20170198189 (Crosslinked Synthetic Polymer-Based Reservoir Drilling Fluid); US Patent Application 20190144736 (Breaker Fluids And Methods Of Use Thereof); and US Patent Application 20170198192 (Breaker Fluids And Methods Of Use Thereof).

Nano particles or spherical beads are sometimes added as a lubricant to downhole fluids for well treatment. Examples of this type of sealant/lubricants can be found in U.S. Pat. No. 9,512,352B2; U.S. Pat. No. 4,063,603 and US Patent Application US2016/0376490A1.

Olefin and alpha olefins are also used in well bore downhole operations. This type of information can be found in U.S. Pat. Nos. 6,159,906 and 5,851,958.

US Patent Application US2005/0263290A1 discloses a standard hydraulic oil with the addition of a polymer and surfactant.

Another embodiment of a down hole fluid comprises a water/oil inverse emulsion using poly glucoside as a surfactant. Further information on these types of fluids are disclosed in U.S. Pat. No. 8,691,732B2; US Patent Application US2015/0184057A1; U.S. Pat. No. 9,796,901B2; U.S. Pat. No. 9,012,379; and WO2008/157791A2.

U.S. Pat. No. 3,210,283 discloses succinimide and hydroxy polyamine as surfactants in down hole compounds.

Other references of interest to the background of the present invention include:

US patent Documents:
U.S. Pat. No. 4,555,352 November 1985 Garner et al directed to Lubricant Additive;
U.S. Pat. No. 7,932,220B2 April 2011 Zazovsky et al directed to Water Compatible Hydraulic Fluids;
U.S. Pat. No. 9,012,379B2 April 2014 Muthusamy et al directed to Alkyl Polyglycoside Derivative As Biodegradable Spacer Surfactant.
US Patent Applications:
US2005/0263290A1 December 2005 Zazovsky et al directed to Water Compatible Hydraulic Fluids;
Foreign Patent Documents:
WO2015/149026A1 October 2015 Dummer et al directed to Lauric Ester Compositions;

SUMMARY OF THE INVENTION

Disclosed is an environmentally friendly biodegradable water-soluble wireline sealant/lubricant composition comprising materials that are generally recognized as safe for the environment and the user. A method of using this composition is also disclosed.

The inventive sealant/lubricants for wireline operations comprise glycerin and or another polyol combined with a water soluble natural or man-made gum and or a natural or man-made water-soluble gum-like polymer. An alternate embodiment includes water in the glycerin-gum mixture. A further alternate embodiment comprises a glycerin water composition with minor amounts of additives, useful for spray wireline applications.

In other embodiments a corrosion inhibitor such as a water soluble or water dispersible filmer may be added to the mixture. The filmer is a class of chemicals typically an amide, imidazoline or carboxylic acid used to prevent corrosion to the wireline. For the present application, NaCap® was used with some of the examples.

In yet another embodiment an extreme pressure additive (EPA) can be added to the mixture. EPA's are additives for lubricants intended to decrease wear on the parts of the gears which are exposed to very high pressures. EPA's comprise short and medium chain chlorinated alkanes, more typically they contain organic sulfur, phosphorus, or chlorine compounds, including sulfur-phosphorus and sulfur-phosphorus-boron compounds, which chemically react with the metal surface under high pressure conditions. The EPA's optionally employed in the present invention consist of an organic phosphorous or organic sulfur compound which are added to prevent premature wear to the wireline. The EPA's can also be added as an anti-wear compound for the wireline operation. Samples can be found on the internet and are commercially available for a variety of desired uses. In the present application, the glycerin also acts as an anti-wear on its own but can be boosted with additional EPA's. Glycerol phosphate is an example of an EPA for use in the present application.

The inventive sealant/lubricant is generally used in above (well) hole drilling operations. Upon use, this becomes the only seal between the gas or oil well and the outside environment. A method of sealing a well hole, using the present sealant/lubricant composition comprises providing the sealant/lubricant composition at a well hole, injecting the composition into a gas or oil flow stream in the well hole flowing around the hole to form a substantially air tight seal, thus sealing the well hole, while simultaneously injecting the composition thru the hole to the wireline to act as a lubricant for the wireline.

In operation, the wireline is moving up and down the well hole. As the wireline is pulled or pumped up the hole, a line wiper exerts force via a pump on a rubber element until a light pressure is exerted on the wireline, cleaning grease and well fluid off the line in the process. With this invention, the cleanup involves simply rinsing the wireline equipment with plain water. There is no further treatment of the water necessary for disposal of the water. According to the US-Environmental Protection Agency, a fluid with the stated components herein, is termed GRAS meaning generally recognized as safe.

The inventive composition provides the following:
1. Fluid seal from gas inside and outside the well hole or the wireline;
2. A lubrication line;
3. Inhibits corrosion of the wireline;
4. Is stable to a temperature of above 195° C.; and below 0° to approximately −50° C.;
5. Forms a tacky composition;
6. Can be used as a spray for wireline applications.

DETAILED DESCRIPTION OF THE INVENTION

Figure 1:
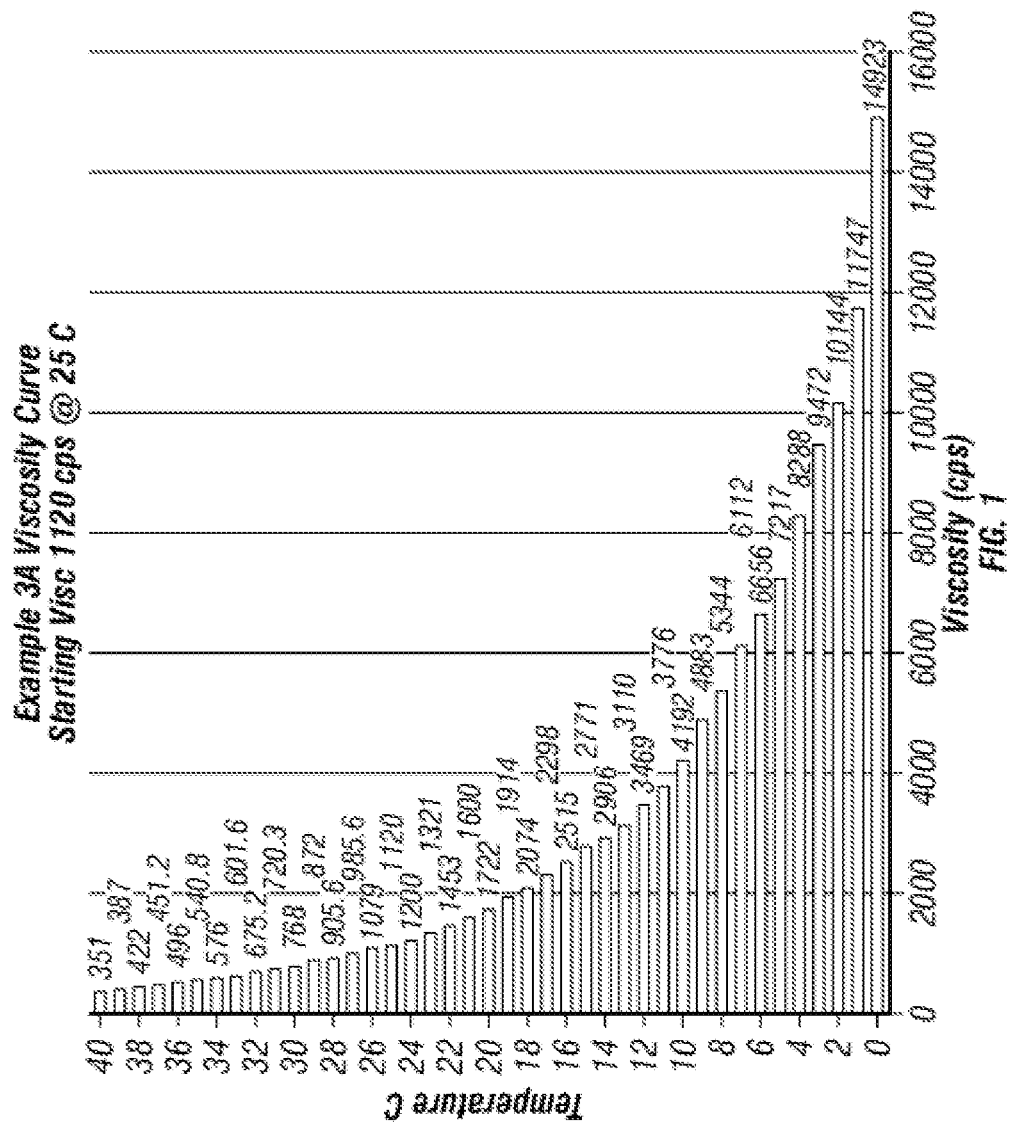
FIG. 1 illustrates a viscosity curve with a starting viscosity of 1120 cps@25 C.

It has been found that the present inventive composition is environmentally friendly, biodegradable water-soluble wireline sealant/lubricant which will reduce hazardous waste, not damage to the environment, and will not create a sheen on water. It will also reduce clean up time and cost associated with clean up after using in a wireline operation compared with traditionally used sealants/lubricants.

The inventive wireline sealant/lubricant composition comprises the following components:
A) A water-soluble polyol, preferably polyol having greater than two and preferably three or more hydroxyl groups, with the most preferred polyol for use being glycerin (a 3 hydroxyl group system). Glycerin is used in the composition in a weight range of 30% to 100%.
B) A water soluble natural or man-made gum and or a water soluble natural or man-made polymer that acts like a gum. The preferred compound being xanthan gum or guar gum. The gum is used in the amount of about 0.02% to 10% by weight.
C) Water may be added in an amount of about 0% to 90% by wt.
D) A corrosion inhibitor which is water soluble or water dispersible may optionally be added in a range of about 0% to 5% by wt.
E) An extreme pressure additive can be also optionally added in a range of about 0% to 5% by wt. The composition was found to have a viscosity range of about 4,500-35,000 cps and tack from light, medium or heavy tack.
F) Optionally, the glycerin water can be prepared without a polymer.
G) Alternate compositions encompass glycerin and maleic anhydride or maleic acid in an amount of about 18-26% by weight, and achieve viscosity up to and greater than 48,000 cps.

The composition was found to be biodegradable and cleaned easily after use on a well hole with water. Due to the environmentally friendly components, the water did not need further treatment prior to disposal after cleanup.

Well terminology as used herein, is intended to be the standard reference in the oil/gas industry. Some definitions are below:

Wellbore refers to a drilled hole including any cased or uncased portions; Uphole or downhole refer to the relative direction of the wellhead; "into a well" or "into the well" refers to injection or introduction of fluids to the wellbore;

Well fluids generally refer to any fluids adapted for introduction into a wellbore for any purpose;

Treatment generally refers to any action or introduction of fluid into a wellbore so as to cause a change in a condition in the wellbore;

Types of wireline generally include:
1. braided cable used to send tools down hole;
2. braided electronic cable (or e-line);
3. slick/smooth wireline used in less stringent applications (typically needing at least a spray for lubrication);
4. "greaseless" polymer coated cable considered by some in the industry to form a better seal at the well hole than other types of wirelines, and generally use hydraulic fluid as a sealant/lubricant, but typically in lesser quantities than other types of wirelines.

As mentioned herein, wirelines can be used on ground and water well applications. Typically when a wireline is in use in an ocean (or water well) environment, oil/gas and well fluids can escape the well hole and drift about 30-40 feet or more away from the well hole, causing a sheen on the water layer (typically the oil layer not mixing with the water). Here it was found that the present composition does not form a sheen on the top layer of the water. This lack of sheen was expected in view of the primary components being water soluble and environmentally friendly. The advantages as sealant and lubricant were not expected in the wireline applications. Glycerin and guar are commonly found in prepared foods and hence safe for human consumption as well as the environment. However, these components were not previously considered for use in oil/gas drilling applications as sealants or lubricants.

Polyols

The structure of glycerin (a polyol) is C3H8O3, wherein each carbon atom is bonded to an OH group. The base structure is (C2H4)O, and the carbon chain can extend C100-200. The carbon chain length used can be as desired provided that the ratio remains about 1-OH to 2-C's or at a value so as to keep the composition water soluble.

Xanthan Gum

Xanthan gum is a Polysaccharide C35H49O29 monomer; this is a natural gum.

Guars

The structure of guar gum is $C_{10}H_{14}N_5Na_2O_{12}P_3$.

Guar is an exopolysaccharide (high modular weight biopolymers composed of sugar residues) consisting of the sugar's galactose and mannose of varying chain length and repeating units. It is sometimes used in the oil/gas industry to serve as a gel thickening agent down hole. It is known to withstand high pressure, especially in the fracturing process. It has a molecular weight of about 535 g/mol.

Alternate polyols useful for the composition include:

Sugars include those such as fructose, lactose, and invert sugars. Polyols such as 1-3 propanediol, 1-1 propanediol, 1-4 butanediol, polyethylene and polypropylene glycols, and the like, or other similar poly alcohols are suitable herein.

The polyol can be used in an amount range of approximately 30%-40% to about 100%, with a preferred range being 60%-99% and a most preferred range being 85%-98%. Glycerin has been found to be the preferred polyol to date. However, other polyols such as propanediols or polyethylene glycols are suitable for the present application. A chain length of C3 to C7 and hydroxyl group number of 2+ has been found to be most efficient for the present inventive composition.

The polymer or gum can be used in an amount range of approximately 0.02% to about 10%, with a preferred range being 0.05% to 8% and a most preferred range being 0.09% to 7%. It was found that glycerin with these polymers provided the most tack and the highest viscosity.

Water can optionally be used in the composition in an amount of about 0% to about 90% by wt. The water is preferably treated with reverse osmosis or can be used as is from a tap or as distilled water. Optionally a preservative may be added to the composition to boost the preservative property of glycerin. Generally, an anhydrous product (oil based) does not need additional preservatives unless they contact water. Since this often is the case with a well hole, adding additional preservative(s) is recommended. An example of a preservative to use here is DMDM Hydantoin or sodium benzoate to be used in an amount range of about 0.05%-2.0%, preferably 0.05%-1.0% and most preferably about 0.5%-0.75% by wt; it is recommended to add a sufficient quantity to inhibit bacterial growth.

Corrosion Inhibitors for Downhole Use (for Acid Protection)

Corrosion inhibitors are used for both downhole and uphole, or above ground protective use. The inventive glycerin mix composition is an excellent sealant and lubricant which, with the addition of corrosion inhibitors, provides a barrier against wear and corrosion to the wireline in corrosive (including highly corrosive) environments and high temperature applications. The use of inhibitor with the glycerin mix chemically binds to the metal surface of the wireline and provides a protective (inhibitor layer) film.

Here, a corrosion inhibitor can optionally be used in the glycerin-gum composition provided it is a water soluble or a water dispersible inhibitor such as imidazolines or polyamides. The corrosion inhibitor may be added in the range of about 0% to 5% by wt. with a preferred range being 0.05% to 4% and a most preferred range of 0.50%-2.0% by wt. The corrosion inhibitor if used, is added in an amount sufficient to control corrosion formation to the wireline.

An imidazoline is the preferred corrosion inhibitor in a water soluble form.

NaCap® Corrosion Inhibitor was used in the present examples. It is commonly employed for oil/gas applications and commercially available from various sources. NaCap® is a 50% aqueous sodium 2-mercaptobenzothiazole, generally used for water, alcohol, and glycol systems. It has been found to be particularly effective in preventing corrosion of copper and brass. While NaCap® is preferred, if a corrosion inhibitor is employed here, an alternative is C1 1101 commercially available from Falizan Tasfyeh Co. Ltd among others and also comprises a 50% aqueous solution of sodium 2-mercapobenzothiazole. C1 1101 is used generally in the oil/gas industry in glycol solutions and for other general purposes.

Corrosion Inhibitor for Uphole/Storage of the Wireline (for Atmospheric and Other Uphole Protection)

Natural and or manmade water soluble polymers and gums mixed with water and the corrosion inhibitors can be used for wireline sprays and wireline fluids in applications where less tack is acceptable. Polymer levels can range from 0.5% or more depending on the polymer or gum used and the viscosity needed. Most often this will be in the 1 to 6% range, with the most preferred level being 1.5%.

An atmospheric rust preventive can be added to protect the wireline while in storage after usage or while in use with either a coated or non-coated wireline. These rust preventives do not protect the wireline down hole but provide protection uphole when the wireline is wound back on the spool to store after each usage. These corrosion inhibitors consist of a blend of dinonylnaphtalenesulfonic acid, an organic acid complex and an amine such as NA-SUL 437 from for example King Industries, or preparation of dinonylnaphtalenesulfonic acid, an organic acid complex and an alkanolamine such as NA-SUL 1019A from for example King Industries. The rust preventives can be used in any water soluble wireline application and the usage range is about 1% to 10%, with the most preferable level range being about 1% to 5%, and the most preferred level of inhibitor being about 5%.

These uphole corrosion inhibitors were purchased from commercially available vendors and added to the inventive polymer solution. The inhibitor coats the wireline during use as an overall sealant/lubricant/metal protector in the downhole application and remains on the wireline for up to about 30 days, depending upon amount of coating and the usage.

The amount to use in the polymer mix, and for coating the wireline is based on the amount of protection the user needs once the wireline is outside the hole, or under atmospheric conditions. The amount of inhibitor should be sufficient to avoid corrosion under the atmospheric conditions at the time of usage. It has been observed that with about 5% of the inhibitor added to the polymer mix, corrosion on the wireline is inhibited for about 30 days. The amount of usage depends on various factors including the overall atmospheric environmental conditions, and the turnaround for re-use of the wireline in another downhole application.

For preparing a corrosion inhibited polymer solution, an embodiment comprising mixing the NA SUL 1019A with stirring at room temp into the glycerin polymer mixture. The stirring can alternately be mixed hot. While there are corrosion inhibitors on the market for wirelines, this application eliminates having to coat the wireline in a separate application or separate treatment step. Heretofore, no one has found that the inhibitor can be added to the lubricant/sealant and maintain the coating for any period of time. This application avoids further corrosion treatment to the wireline when it is stored uphole. Not wishing to be bound by theory it is believed that the inhibitor bonds electrostaticly with the metal surface of the wireline. It is considered a weak bond (unlike strong bonds like paint) and therefore protection from corrosion is found to last from about 1 to 30 days. To date, no commercially available wireline treatment has been found to inhibit corrosion above the hole using the inventive one-stop lubricating/sealing/inhibitor application as disclosed herein. This is a new composition and method of application found for existing corrosion inhibitors for wireline treatment usage.

When used in wireline spray applications the glycerin water mixture also provides lubrication at a very desirable low temperature range and viscosity level. In greaseless polymer-coated wireline applications, is it well known that glycerin is a good non-metal to metal lubricant. It has been learned that in standard non-coated wireline applications, the glycerin mixtures will also provide excellent lubrication between elastomer seals and the wireline, as well as the correct viscosity and protection in the corrosive environments. It has surprisingly been found that the glycerin water mixtures provide excellent lubrication when used in non-coated wireline applications.

The new and novel compositions of Examples 8-11, were found to be useful in both coated and non-coated wireline applications. They can be used with spray applications or as applied otherwise. Field tests indicated by observation, excellent anti-corrosive and lubrication properties to the wireline. These results were seen whether the seal was metal to metal, non-metal to metal, or non-metal to non-metal. Among other results, the most surprising was that the composition worked well for non-metal to metal, and, metal to metal applications since glycerin is not known to work as a lubricant in non metal to non metal applications. Furthermore, the wireline spray application worked well on the metal non-coated lines. The compositions protected the wireline in both coated and non-coated applications for up to 30 days. It is known that for normal oil field use of wireline sprays, it is difficult to alter the viscosity because of the hard carbon based nature of the spray composition. The unique glycerin/water compositions of this invention allow for the viscosity adjustment based on diverse needs in the field. One can adjust the % of glycerin or water as needed. The spray wireline compositions have a viscosity range of from about 5-900 cps. The glycerin can range from about 30%-99.8% while the water can range from about 70%-0%, with the remaining components being the inhibitors and additives as needed or desired. It has been found that at about 30% glycerin, a spray wireline solution can be created which can be applied with a pump type garden sprayer and have a viscosity of approximately 1-2 cps.

An additional feature of the new glycerin/water spray wireline compositions, good for both coated and non-coated, metal or non metal wires, is that the wires and associated equipment clean easily. The formulas are biodegradable and will not create an oil-sheen on water. Other traditional formulations which state are biodegradable, generally require some other tasks before the solution can be sent down the water drain. The traditional biodegradable solutions are also difficult to clean off the wireline. Here, it has been found that a straight water wash with slight pressure will remove the spray solution. Unlike conventional waterline spray solutions, once the water has dissolved the formulation, there is no sheen remaining on the top surface of the waste water layer.

EXAMPLES

Examples 1-6 were all prepared according to the process of example 1 except as noted. Examples 1-5 also contain an imidazoline as corrosion inhibitor in an amount used of 0.15-5.0 wt % depending on the application. Examples 6-7 contain mercaptan as corrosion inhibitor in the amount of 0.15-5 wt %. The corrosion inhibitor is considered negligible and does not affect viscosity.

Example 1

1.03 grams of commercially available xanthan gum is dissolved into 100 mils of water. To this mixture, 100 grams of commercially available technical grade glycerin is added and the solution is mixed well and then further heated to 165° C. for about 4 hours with mixing. The mixture can be prepared without the addition of heat. After 4 hours the water evaporated leaving a mixture of thickened polymer/glycerin having a homogenous viscous gel appearance. This is used as a dispersant and then diluted as desired. After the water is removed, an additional 150 grams of glycerin was added, and the mixture was again heated with mixing (stirring) to 100° C. until a uniformed homogeneous, clear viscous product is obtained. This is now considered the concentrated solution (or the concentrate). The composition resulted in an excellent viscosity grade 24 wireline sealant/lubricant with a 24,800-cps viscosity @ 25° C. with excellent tack and lubricity.

Example 2

To the above example, after 4 hours, 100 grams of water is mixed into the polymer-glycerin concentrate. This resulted in a composition having medium level of tack and a viscosity of 4800 cps at 25° C. This is an excellent light end wireline fluid for low pressure operations. This is a low temperature use grade product.

Example 3

The concentrate was diluted with 100 mls glycerin a third time to yield the desired properties for the wireline operation. This mixture is very tacky and has a viscosity of 31,000 cps@25 C. The resulting concentrated composition formed for this example comprises:

Resulting Concentrated Composition: 95.62 Glycerin, 2.87% Water, 1.51% xanthan gum.

Example 4

58.8% (58 mls) of the above concentrated composition of Example 3, was mixed with 41.2% (41.2 mls) additional glycerin by wt. The resulting mixture is less tacky than the concentrate but remains with good tack. It was found to have a viscosity of 25,000 cps at 25° C.

Example 5

50% (50 mls) glycerin and 50% (50 mls) water was added to the concentrate of example 1, to produce a composition having a viscosity of 32 cps. A mixture of glycerin and water can be used as a sealant for the new grease-less wirelines that have a coating on them. The coating helps to reduce wireline fluid use. Some gum or polymer could be added if needed but, in most cases, a lower viscosity fluid is needed. For the grease-less wireline, it is typical to use 32 to 46 cps hydraulic fluids as the wireline lubricant/sealant spray, and hence this inventive composition was found to be an alternative.

For examples 6 and 7, example 1 was repeated using mercaptan compound as a corrosion inhibitor.

Example 6

To the concentrate of ex 1, added 66% (66 mls) glycerin, and 34% (34 mls) water. This mixture yielded a viscosity of 43 cps at 25° C.

Example 7

The composition of example 7 included glycerin and mercaptan corrosion inhibitor. No xanthan or water was used. The purpose of this example was to determine the composition properties for use as a lubricant. The composition at 100% glycerin yielded a viscosity of 900 cps at 25° C.

Alternate Composition:

An alternate composition comprises the mixture of glycerin mixed with maleic anhydride, or maleic acid or adipic acid. While other higher chain acids were employed, it was found for the present purposes, maleic and adipic anhydride/acids worked best. C9 and C10 acids created compositions useful for waxes and greases. In this reaction, the two components (glycerin and either maleic anhydride, maleic acid, or adipic acid) are mixed while heating to above 151° C., preferably about 200° C. with stirring for about 12 hours. The composition will cross link and form a water soluble mixture which is biodegradable. A corrosion inhibitor, preservative, and/or EPA may be added. It is important that no water be present during the reaction. Generally maleic anhydride (preferred of the 3 noted) is used in an amount of about 18%-26% by wt. with the remainder being glycerin by wt. The anhydride or acid, like the glycerin is commercially available and commonly found. Three (3) examples were conducted to make this composition having the following: Maleic anhydride, maleic acid or adipic acid can be used in the range of 3%-29% acid, to yield viscosity ranges of 1000-40000 cps.

Example 1A: viscosity=48000 cps, and had a semi fluid consistency; for this example, the reaction included 74% glycerin mixed with 26% maleic anhydride to yield the noted viscosity.

Example 2A: a concentration of 16% maleic anhydride and 74% glycerin yielded a product having a viscosity of 16,000 cps and a viscosity grade of 16 cps.

Example 3A: for this example, 20.9% maleic anhydride and 79.1% by weight glycerin was used to form a composition having a viscosity of 23,392 cps.

The viscosity can be varied changing the percentage of the components or varying the reaction time.

If it is desired to use maleic acid instead of anhydride or adipic acid, it is recommended to heat the reaction longer than 12 hours, preferably about 2 days, or until substantial complete, or complete crosslinking occurs.

The compositions of examples 1A-3A, were prepared to meet the properties of the wireline, including having sufficient tack so as to form a seal with the wireline, and sufficient viscosity in the range of 15,000-48,000 cps. For the example 3A composition, 20.9% maleic anhydride was employed, and yielded a maximum viscosity of 23,392 cps if the reaction is run to completion. In this case for the field tests, the reaction was run until the viscosity of 20,000 cps was reached, at which point the reaction was stopped via neutralization with monoethanolamine.

Field tests conducted on the composition of example 3A performed as expected on the wireline and well hole during use. It was found that the longer run times for the reaction, the more chains crosslinked, and branched off making the formulation more viscous. Reaction time thus affects viscosity here.

Temperature—viscosity measurements were conducted on the formulation of example 3A, varying the starting viscosity (which was varied by reaction time). The temperature was noted when the viscosity reached 10,000 cps. These are important pieces of information for the user since a viscosity of 10,000 cps is the ideal viscosity at actual operating temperature. If the user knows the operating temperature, then the user can choose the correct viscosity grade (at 25 C) to yield 10,000 cps viscosity at the operating temperature.

Figure 2:
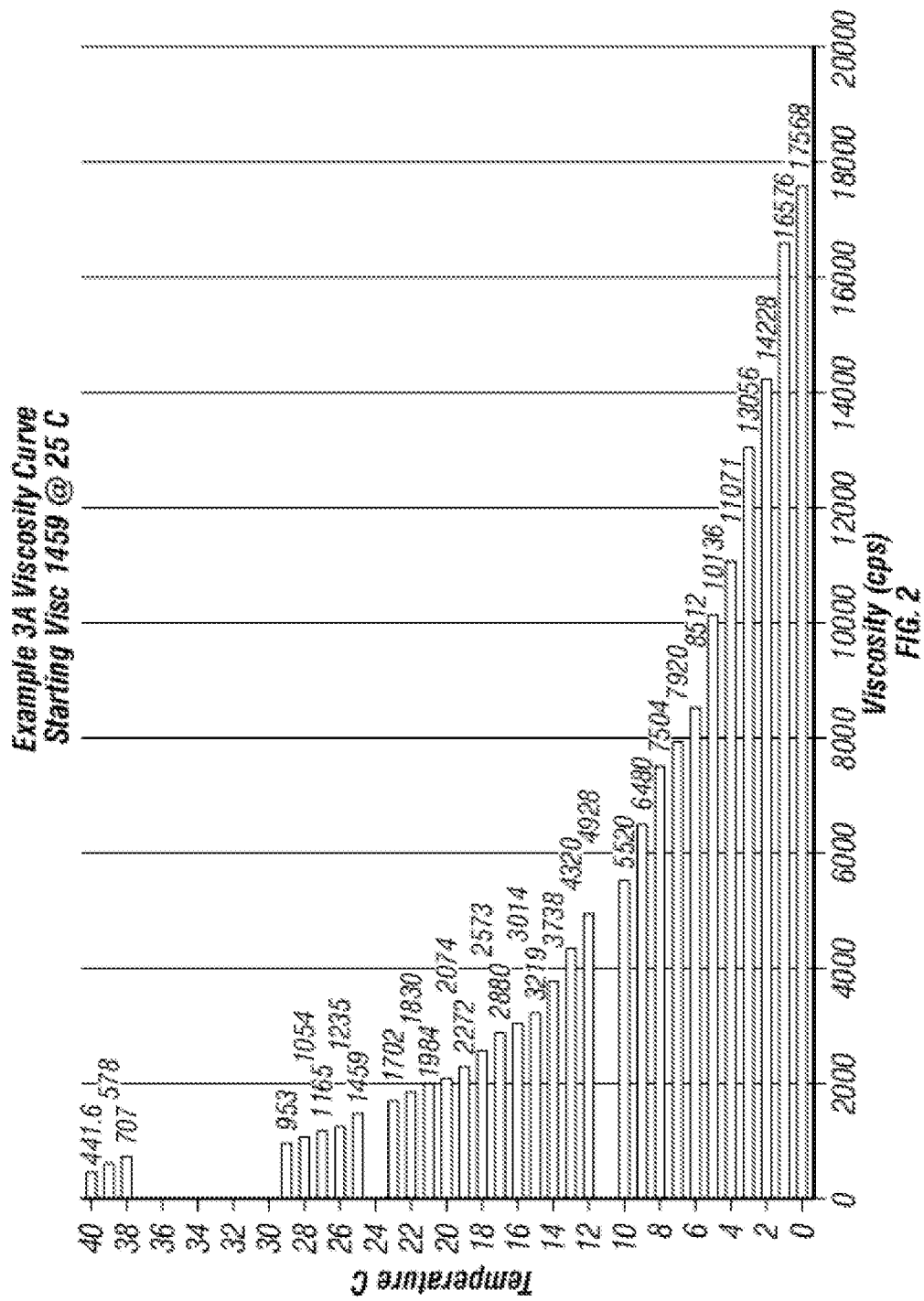
FIG. 2 illustrates a viscosity curve with a starting viscosity of 1459 cps@25 C.
Figure 3:
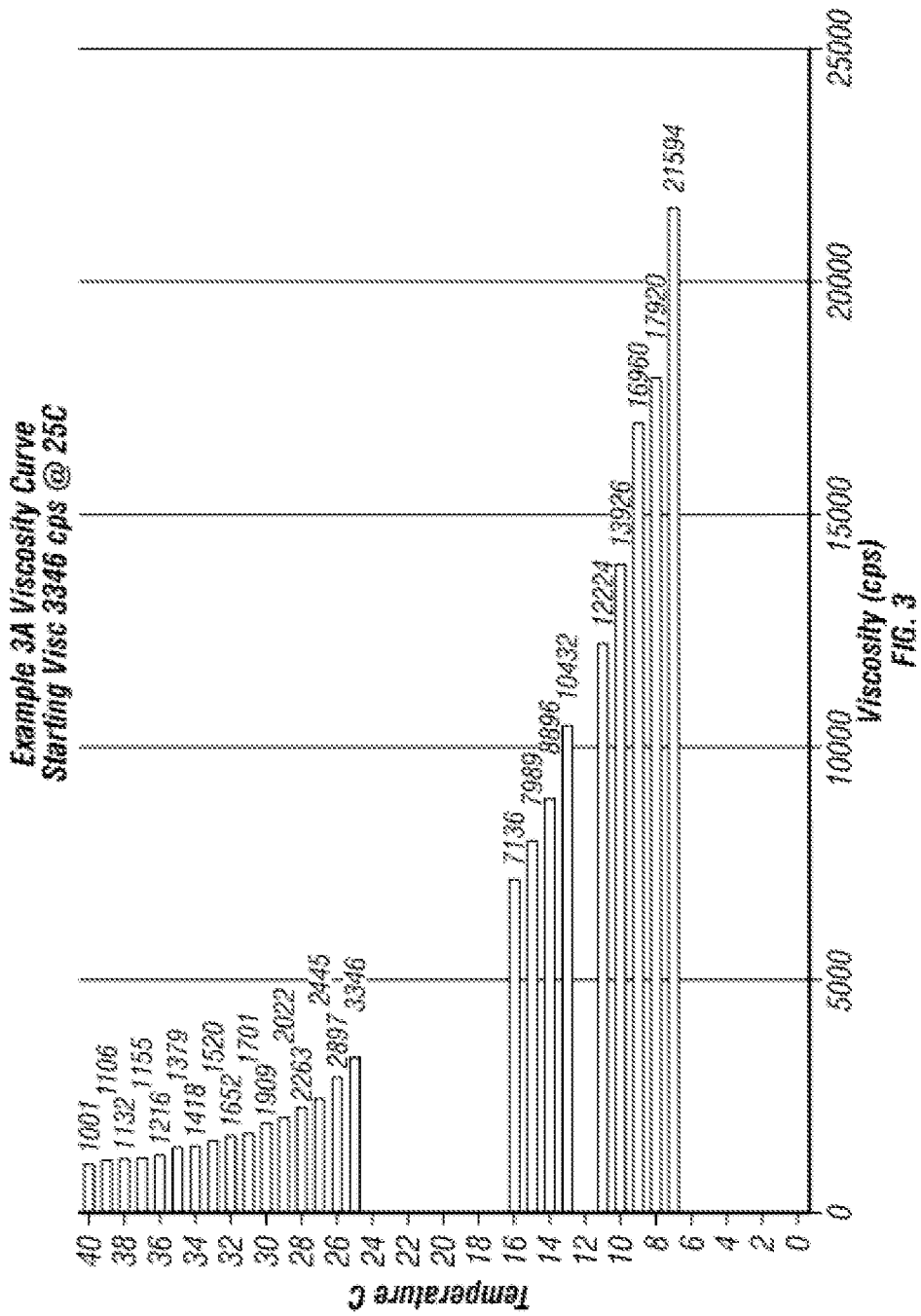
FIG. 3 illustrates a viscosity curve with a starting viscosity of 3346 cps@25 C.
Figure 4:
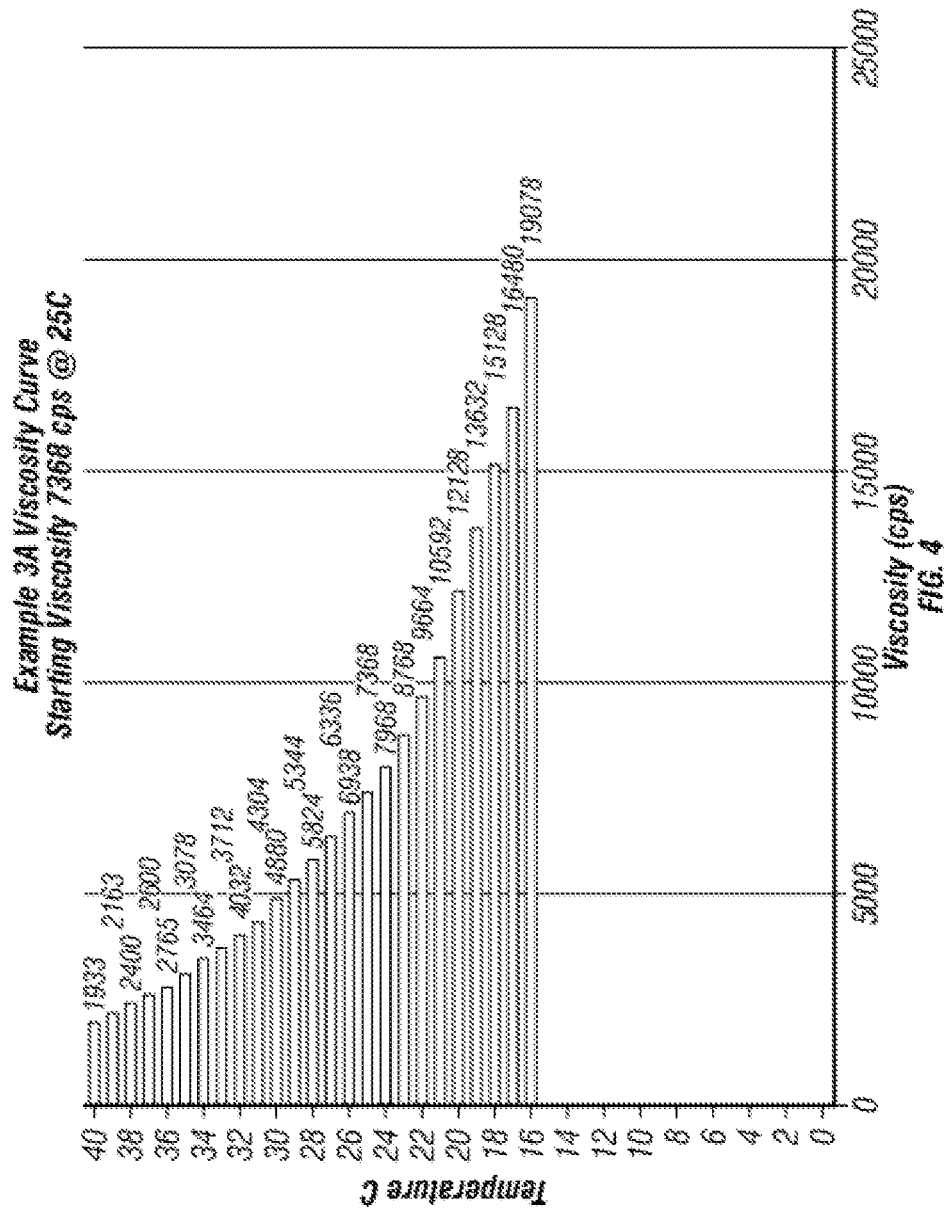
FIG. 4 illustrates a viscosity curve with a starting viscosity of 7368 cps@25 C.
Figure 5:
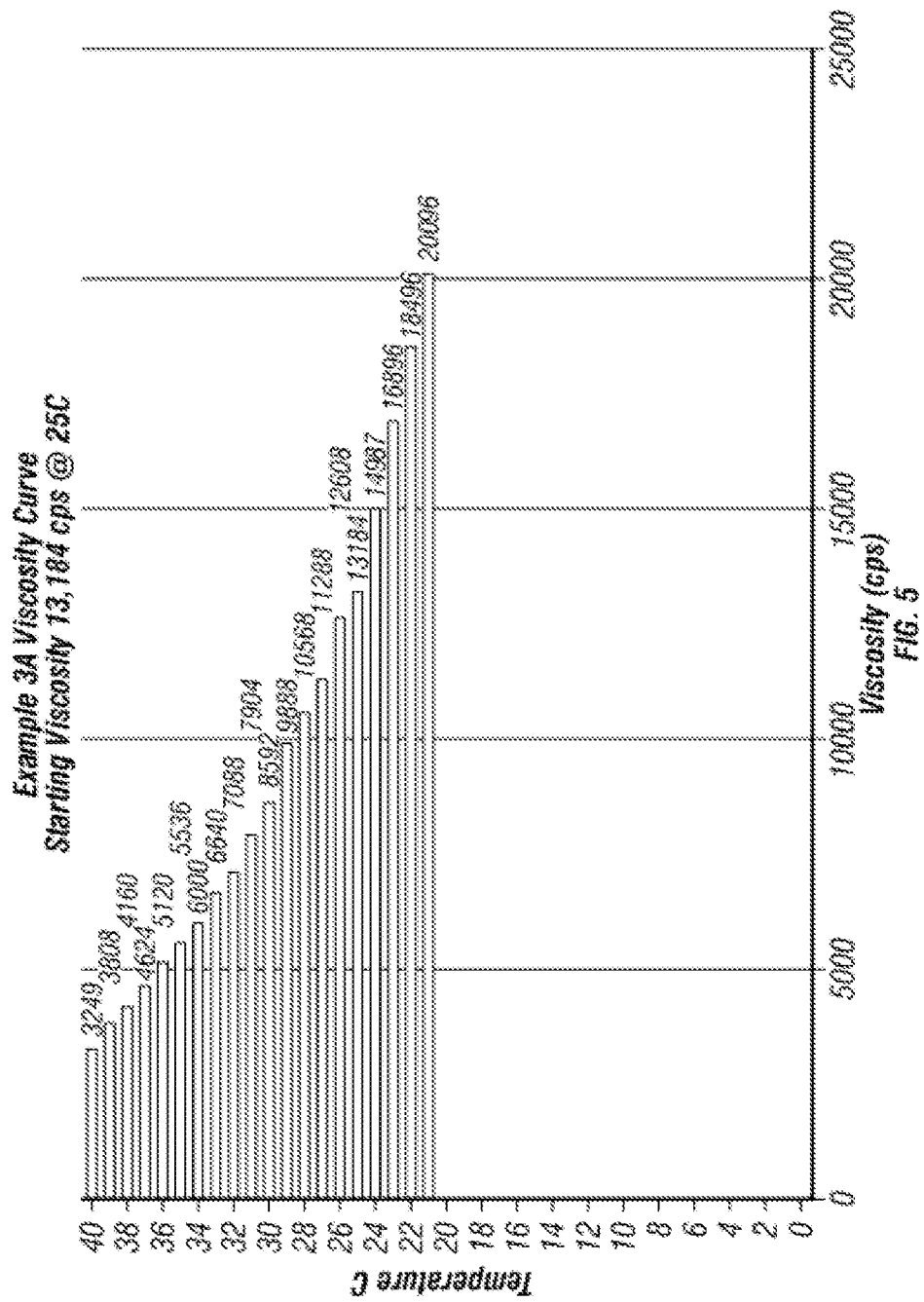
FIG. 5 illustrates a viscosity curve with a starting viscosity of 13,184 cps@25 C.
Figure 6:
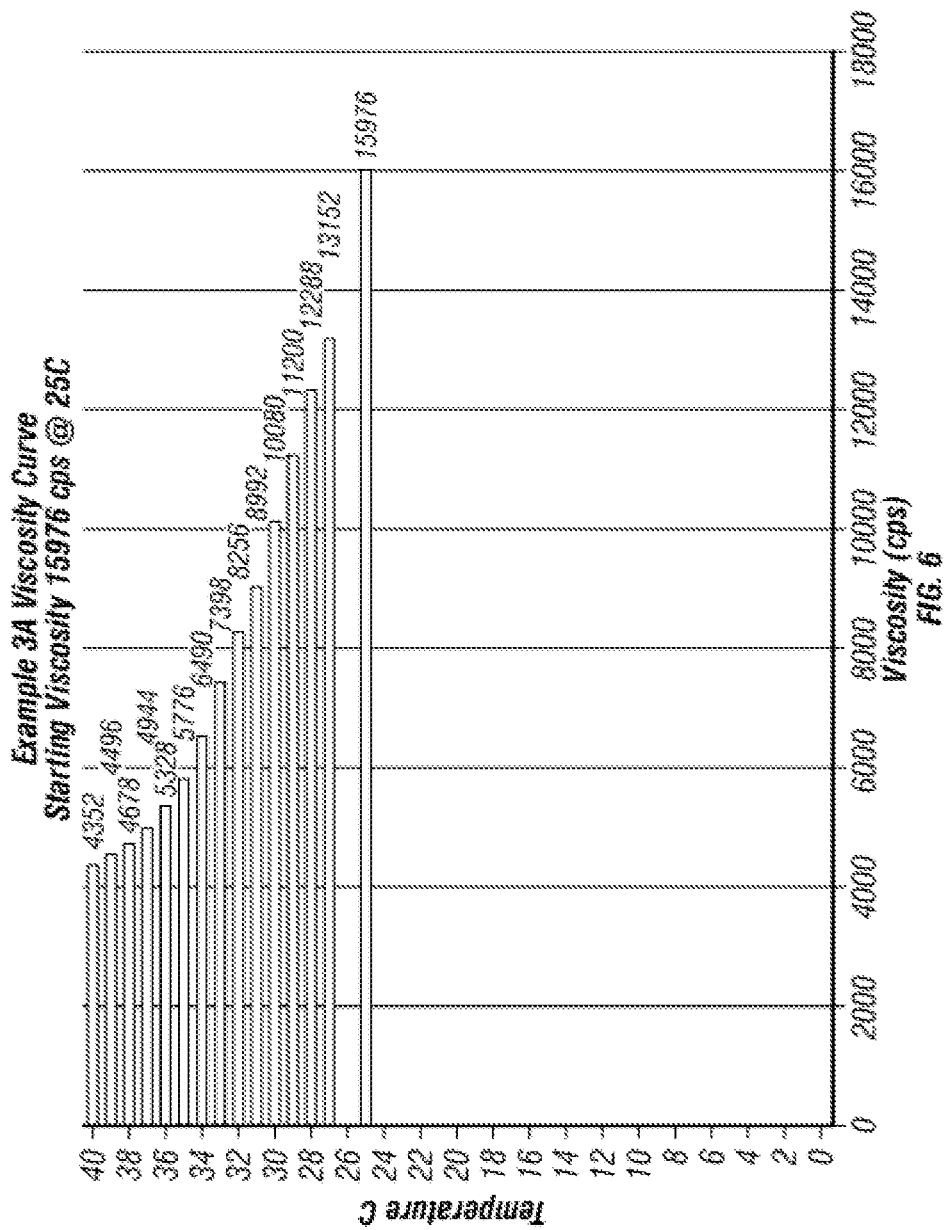
FIG. 6 illustrates a viscosity curve with a starting viscosity of 15,976 cps@25 C.
Figure 7:
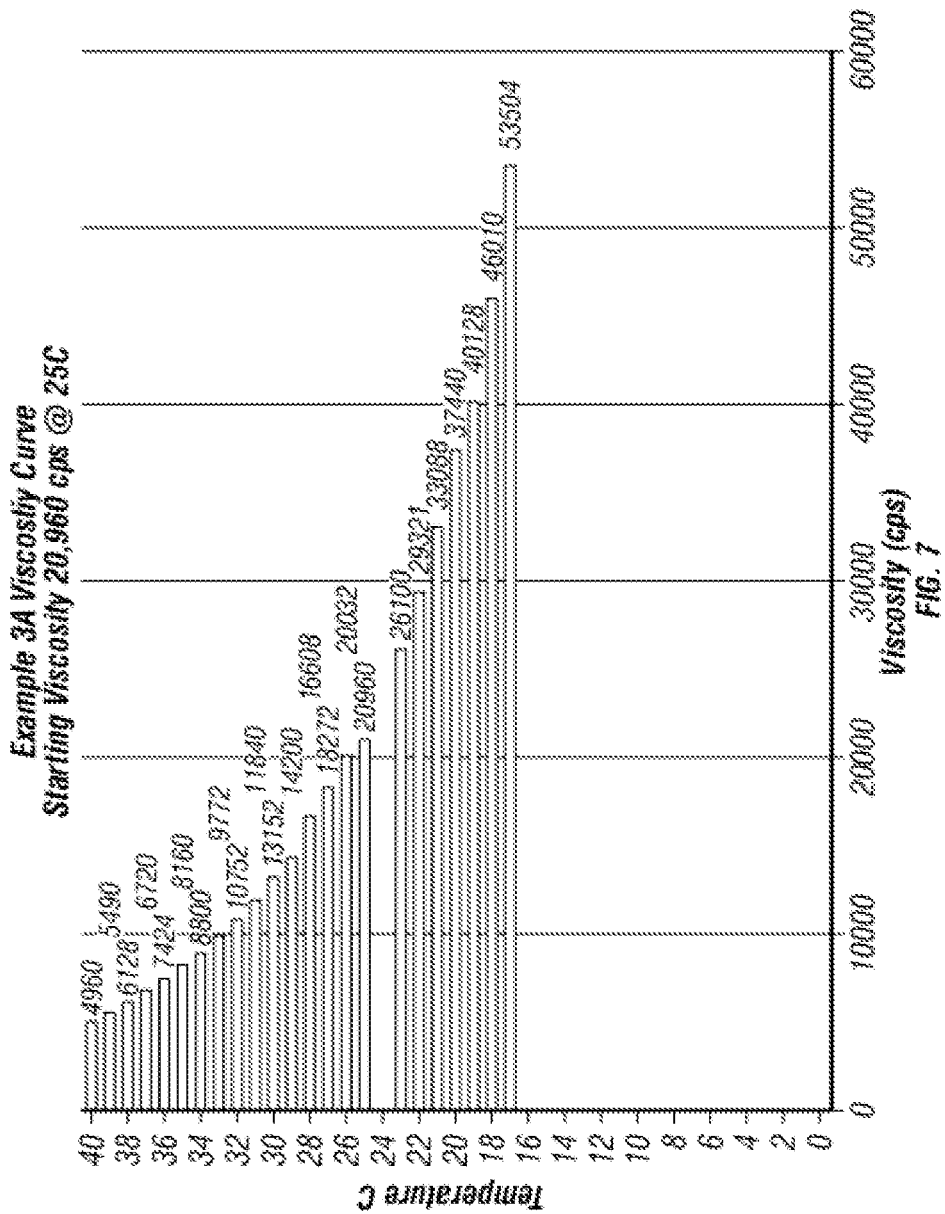
FIG. 7 illustrates a viscosity curve with a starting viscosity of 20,960 cps@25 C.
Figure 8:
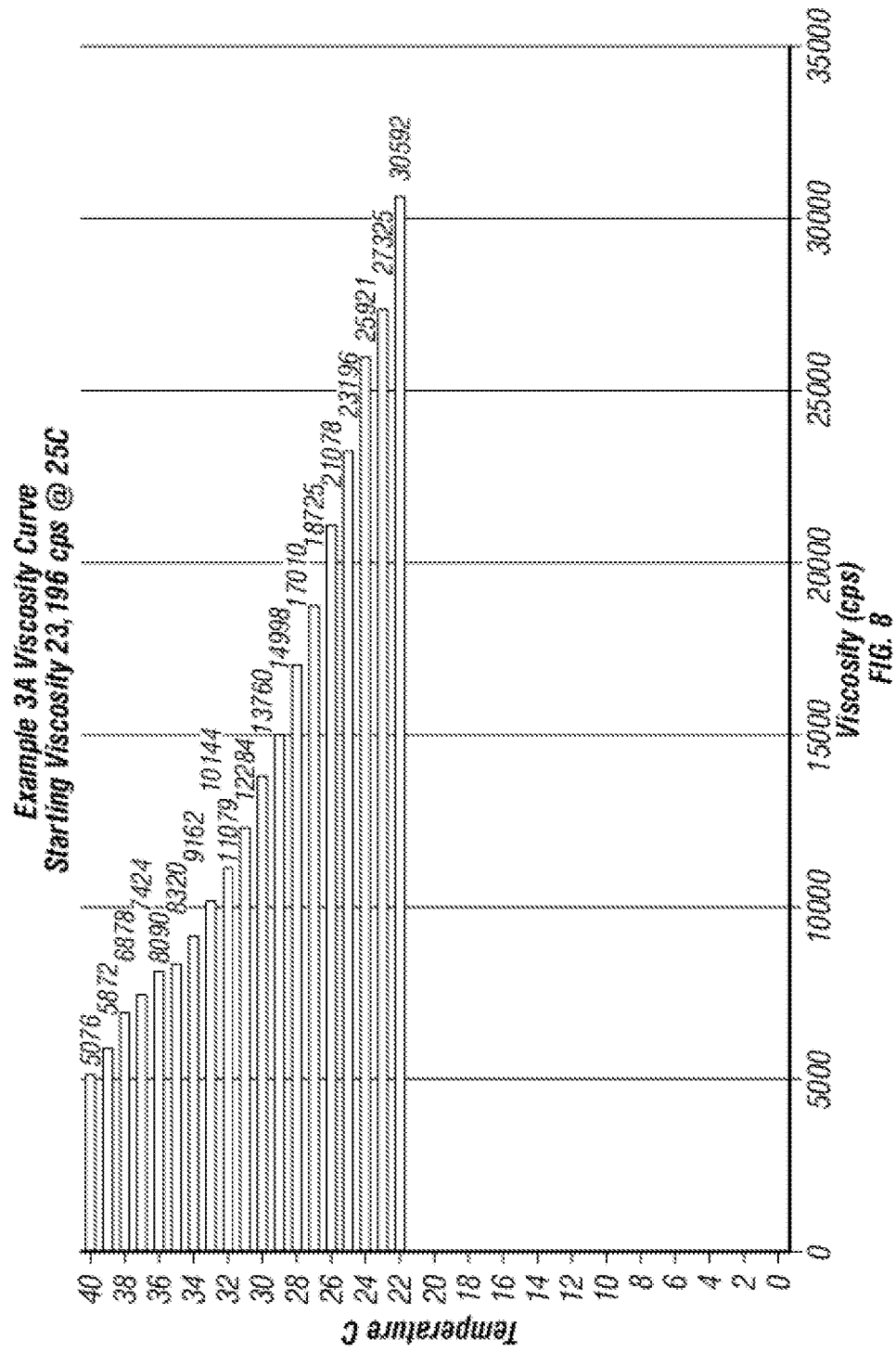
FIG. 8 illustrates a viscosity curve with a starting viscosity of 23,196 cps@25 C.

Results are posted in Table 1 and also in the viscosity-temperature curves herein. FIGS. 1 through 8 illustrate the various temperature viscosity curves employing the composition of example 3A.

TABLE 1

Viscosity Temperature Determination
Temperature where viscosity reaches 10K cps @ 25 C.

| Viscosity (cps) | 10,000 cps | ISO Grade cst @ 40 C. |
|---|---|---|
| 24,000 | 33 C. | 5076 |
| 20000 | 32 C. | 4960 |
| 16000 | 30 C. | 4552 |
| 12000 | 28 C. | 3200 |
| 7500 | 21 C. | 1933 |
| 3000 | 13 C. | 1000 |
| 1400 | 5 C. | 460 |

Injection Profile and Noise Log for Field Tests Performed for Wireline Lubricant/Sealant Formulation of Example 3A—Viscosity 20,000 cps@25 C Field trials 1 and 2 were conducted on CO2 injection wells using the formulation of example 3A. A third field trial was conducted on a disposal well having high levels of H2S using the same formulation. Details are below.

The first field test conducted as an injection profile on a CO2 injection well. 12' of 1.375" tungsten bars and profile logging tool string were used. There was 1000 psi of pressure on the tubing. Logging was performed and then a shut-in survey was done. It was observed that a seal was kept for approx. 3 hours with the last hour consisting of logging a temperature survey pulling out of the hole. The 20 viscosity grade wireline seal was used and coated the wireline as it came out of the hole. Comparing standard grease, the wireline comes out of the CO2 wells very dry. Approx. 3000 psi was maintained on the grease pump. When lowering tools out of the lubricator, it was found the tools would not fall. Logger suspected that the wireline was sticky in the grease head due to build up of honey oil.

The second field test found that falling down on the $2^{nd}$ well with 200 psi was difficult. Only 7' of weight bar was used on the $2^{nd}$ well. Logger made 2 runs in the hole on $2^{nd}$ test keeping a seal the entire time. Logger did not have any issues with tools falling out of lube after first run in the hole on the $2^{nd}$ test. The hydraulic grease pump had no problem moving this honey oil.

A third field test was conducted on a disposal well inside a gas plant. This well disposes of the by-products of the plant processes. H2S levels in injection fluid were approx. 30% and downhole H2S levels were in excess of 35% (350,000 PPM). In order to minimize H2S risks, the plant shut down operations and injected diesel to keep H2S gas down hole as much as possible. Rigged up was a 7/32 monoconductor nickel line, a 3 stage grease head, and a 10K grease package/grease pump. Concerns for this unique job were that the diesel would cut through the standard wireline grease and cause a loss of grease seal which would pose a significant H2S risk. Rate and pressure during the study was approx. 1.5 B/M at 2950 PSI and the grease package operator had no issues keeping a seal. This seal was maintained even with limited grease head stages and fast wireline operation needed to perform the job.

The field tests 1 and 2 on two different types of CO2 wells show the effectiveness of these novel compositions of matter. The tests show the seals on the wirelines were maintained and no corrosion occurred. On the $3^{rd}$ test having a well with a high sulfur content, (third field test) the tool used had been coated with an epoxy to control the corrosion. The tool and wireline were exposed to the sulfur down hole for about 3 hours. Upon removal from the well, the tool was blistered badly, with much of the epoxy removed. However, the wireline was fine. The high sulfur content did not appear to impact the ability of the formulation to maintain the wireline or the seal. This sealing trait in high sulfur content environment was surprising and unexpected, as a comparative standard viscosity grade 24 wireline grease/seal lubricant failed almost instantaneously.

The novel compositions of Examples 8-11 were found to be useful in both coated and non-coated wireline applications and exhibited excellent anti-corrosive and lubrication properties to the wireline based on field tests observations. Examples 8-11 reflect glycerin-water compositions of approximately 98%-50% glycerin, water at approximately 0% to 50%, and the remaining percentage comprising additives as desired, with a viscosity range of approximately 5-850 cps at Viscosity Grade @ 25° C. Examples 8-11 illustrate glycerin-water-additive compositions and the resulting viscosity and freeze points. Each example had a target viscosity range as noted.

The wireline spray compositions of Examples 8-11 were prepared by mixing all components together at room temperature with stirring. The objective was to prepare compositions of different viscosities and having low freezing points, so as to meet the needs of low temperature environments, such as found in Alaska, or Canada. Table 2 illustrates composition and results of examples 8-11.

TABLE 2

Composition and Results of Example 8-11

| Example | % Glycerin | % Water | % NaSul | % MEA | % NaCap | Viscosity @ 25° C. (cps) | Freeze pt (° C.) |
|---|---|---|---|---|---|---|---|
| 8 | 97.5 | 0 | 1 | 1 | 0.5 | 780.8 | 0 |
| 9 | 70 | 27.5 | 1 | 1 | 0.5 | 68 | −42 |
| 10 | 60 | 37.5 | 1 | 1 | 0.5 | 32 | −38 |
| 11 | 50 | 47.5 | 1 | 1 | 0.5 | 7 | −38 |

The following abbreviations are defined as follows:
NaSul 437—dinonylnaphthalenesulfonic is a corrosion inhibitor, used herein at about 1% (+/−20%) concentration range. The material is commercially available from King Industries of Norwalk, Conn.
MEA—mono ethanol amine, used at a range of about 0.01-1.0%.
NaCap—sodium-2-mercaptobenzothiazole functions as a corrosion inhibitor, filmer, and is commercially available from at least Vanderbilt Minerals LLC. It is used in a range of 0.50% (+/−20%).

Example 8

Viscosity Grade @ 25° C., Visc Range 680-820 cps
Composition: 97.5% Glycerin, 1% NaSul 437, 1% MEA, 0.5% NaCap
Result: Viscosity=780.8 cps@25° C.; Freeze point 0° C.

Example 9

Viscosity Grade @ 25° C., Visc Range 60-80 cps
Composition: 70% Glycerin, 27.5% Water, 1% NaSul 437, 1% MEA, 0.5% NaCap
Result: Viscosity=68 cps@25° C., Freeze point −42° C.

Example 10

Viscosity Grade @ 25° C., Visc Range 25-40 cps Composition: 60% Glycerin, 37.5% Water, 1% NaSul 437, 1% MEA, 0.5% NaCap
Result: Viscosity=32 cps@25° C., Freeze point −38° C.

Example 11

Viscosity Grade @ 25° C., Visc Range 5-10 cps
Composition: 50% Glycerin, 47.5% Water, 1% NaSul 437, 1% MEA, 0.5% NaCap
Result: Viscosity=7 cps@25° C., Freeze point −38° C.

The present invention is an important composition of matter, and method of using since the problem in the industry is so large and has yet to be completely solved. In spite of sealants and lubricants available, none have solved the problem of actually sealing the well hole while lubricating the wireline and being environmentally friendly. Upon seal and/or lubricant failure, a wireline is lost complete with any tools it carries for use in the well hole, costing resources of time, money, and labor for repair and reinstituting operations.

It was found when the compositions of examples 1-7 were prepared, they had a greater than expected tack property. This was not expected since it is known that the mixture of water and gum yields no tack property. However, the tack of the mixture allowed the composition to be considered for a sealant/lubricant. It has long been desired to have an environmentally friendly sealant/lubricant for the oil and gas industry, and the present composition meets the parameters desired for such. The optional use of corrosion inhibitor, EPA, and/or preservative is employed in small quantities so as to be negligible to the environment. The current compositions have been found to be environmentally friendly, especially in an ocean or water setting.

The novel compositions of Examples 1-7 were also found useful for wireline spray applications like the compositions of Examples 8-11. However, it was found that the compositions of examples 8-11, were better suited for low temperature environments, and the compositions had freezing points in the range of 0° C. to approximately −50° C. The alternate compositions of examples 1A-3A were found to exhibit excellent properties against highly acidic environments, such as a 30% H2S content wellhole. Overall, the compositions yielded viscosity ranges of from about 5 cps—48000 cps depending on amount of water, glycerin, gum, and additives.

All compositions exhibited good to excellent anti-corrosive and lubrication properties to the wireline as sprays based on visual observations.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the description of the related art and detailed description of embodiments, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only and is not intended to limit the invention.

What is claimed:

1. A composition of matter useful as a sealant or lubricant in oil and gas well holes, comprising
    a. a water-soluble polyol in the range of 30% to 99.8%;
    b. a water soluble gum in the range of 0.02% to 10% by weight;
    c. water in the range of about 0% to by 70% by wt.;
    d. a water soluble corrosion inhibitor in the range of 0% to 5% by wt.; and,
    e. an extreme pressure additive in the range of 0% to 5% by wt. and forming a water soluble sealant or lubricant for use in oil or gas well hole wireline applications wherein the composition of matter further comprises maleic anhydride, maleic acid, or adipic acid.

2. The composition of claim 1 wherein the polyol is glycerin.

3. The composition of claim 1 wherein the gum is selected from xanthan and guar gum.

4. The composition of claim 2 having a viscosity range of 5 cps-48000 cps@25 C.

5. The composition of claim 4 having a viscosity range of about 4,500 cps-35,000 cps@25 C.

6. The composition of claim 1 wherein the maleic anhydride, maleic acid, or the adipic acid is used in an amount of about 18%-26% by wt of the composition of matter.

7. The composition of claim 1 wherein the corrosion inhibitor comprises a blend of dinonylnaphtalenesulfonic acid, and an amine, and wherein the blend is added in the range of 0.15% to 5% by wt.

8. The composition of claim 2 having a viscosity range of about 5 cps to about 48000 cps at 25 C.

9. The composition of claim 1 wherein the extreme pressure additives are selected from glycerol phosphate, dinonylnaphthalenesulfonic acid, mono ethanol amine, and sodium-2-mercaptobenzothiazole.

10. A method of using a composition of matter comprising: mixing:
    a. a water-soluble polyol in the range of 30% to 99.8%;
    b. a water soluble gum in the range of 0.02% to 10% by weight;
    c. water in the range of about 0% to by 70% by wt.;
    d. a water soluble corrosion inhibitor in the range of 0% to 5% by wt.; and,
    e. an extreme pressure additive in the range of 0% to 5% by wt. and forming a water soluble sealant or lubricant composition, wherein the composition of matter further comprises maleic anhydride, maleic acid, and adipic acid, and thereafter, injecting the composition into a gas or oil flow stream in a well hole flowing around the well hole to form a substantially air tight seal, thus sealing the well hole, while simultaneously injecting the composition thru the well hole to the wireline to act as a lubricant for the wireline of a well hole during use.

11. The method of claim 10 wherein the corrosion inhibitor comprises a blend of dinonylnaphtalenesulfonic acid, and an amine, and wherein the blend is added in the range of 0.15% to 5% by wt.

12. The method of claim 11 wherein the wireline is protected against corrosion when stored under atmospheric conditions for up to 30 days.

13. The composition of claim 1 wherein the polyol is glycerin and the composition of matter includes maleic anhydride.

14. The composition of claim 9 wherein the polyol is glycerin and the extreme pressure additive is dinonylnaphthalenesulfonic acid.

15. The composition of claim 1 wherein the polyol comprises glycerin, fructose, lactose, 1-3 propanediol, 1-1 propanediol, 1-4 butanediol, polyethylene glycol and polypropylene glycol.

16. The composition of claim 2 wherein the maleic anhydride, maleic acid, or adipic acid is blended with the glycerin in a range of 3% to 29%.

17. The composition of claim 16 having a viscosity range of 1000-40,000 cps@25 C.

* * * * *